United States Patent Office 3,119,873
Patented Jan. 28, 1964

3,119,873
PROCESS FOR THE PRODUCTION OF CYCLO-
HEXANOL AND CYCLOHEXANONE
Alfred Buck, Chur, Switzerland, assignor to Inventa
A.G. für Forschung und Patentverwertung, Zurich,
Switzerland
No Drawing. Filed Aug. 26, 1959, Ser. No. 836,067
Claims priority, application Switzerland Oct. 3, 1958
1 Claim. (Cl. 260—586)

The invention relates to the manufacture of multiple products from single starting materials by consecutive reaction, and, more particularly, to reactions of liquids with gases.

Many reactions of liquids with gases, e.g., the oxidation of hydrocarbons with oxygen or the reduction of reducible liquids with hydrogen, are carried out by introduction of the gas in the form of bubbles into the liquid whereby the former is evenly distributed by a system of jets. The gas bubbles formed rise through the liquid layer, and the gas is transmitted into the liquid.

Often, several reaction products form consecutively, i.e., from a substance A, a substance B forms by reaction with a gas which, upon further acceptance of the gas, is converted into substance C. Such a chain of reaction hereinafter is called "consecutive reaction." The reaction velocity constants of such consecutive reactions can be influenced, depending upon the reaction conditions, in such a manner that, e.g., the substance B is formed in maximum quantities, if so desired. However, in addition to the usual reaction conditions, such as temperature, pressure, catalyst, proportions, etc., other values are to be considered in order to attain a maximum quantity of the substance desired.

It is commonly known that in any instance when different phases border on each other, boundary layers or interfaces form. These boundary layers or interfaces also limit the gas bubbles. The interfaces are formed of the corresponding liquids and constitute a liquid layer of a thickness of several molecule diameters.

The following process may occur: Gas molecules leave the gas jet and convert the monomolecular liquid layer of substance A, immediately adjacent, into the intermediate product B. The gas now meeting substance B acts thereon and produces substance C. This may be followed by further products D, E, etc. Considering the boundary layer as the sum of consecutive molecular layers, it is evident that, in the manner described, the layers immediately adjacent to the gas react to form C first, and, thereafter, all layers react against the liquid. Consequently, a reaction mixture is obtained consisting essentially of higher reaction products.

It now has been found that the reaction of liquids which can be converted into different materials by consecutive reaction with gases into preferably only partially converted reaction products is advantageously carried out in such a manner that the gas is bubbled through the liquid in such a manner that the size of the bubbles assures a strong liquefaction of the boundary layer. It is easily understood that, when the reaction of liquids with gases is not carried to the highest possible reaction product but is interrupted in an intermediate stage, care must be taken to separate the materials reacted into the desired product from the gas of reaction before the latter can react them to undesired higher reaction products. According to the invention this is accomplished by selecting the size of the gas bubbles in such a manner that the boundary layer, upon the rise of the gas bubbles through the liquid layer, by the action of shearing forces constantly is broken up so that, in a manner of speaking, the individual bubble always leaves its own skin. This effect, i.e., the renewal of the boundary layer, generally occurs even with gas bubbles having a diameter of less than 6 mm., however, it is advisable to hold that diameter at approximately 20 mm. and more.

This effect, naturally, does not only take place with the reaction of pure gases but also when the gas consists of a mixture of gas of reaction and inert gas. In that case, the presence of the inert gas effects the formation of comparatively large bubbles without exposing the boundary layer to an excess reaction gas.

When, e.g., cyclohexane is oxidized at elevated temperatures and pressures with oxygen-containing gases, several oxidation products are formed consecutively, i.e., cyclohexanone, cyclohexanol, and acids. The preferred products are cyclohexanone and cyclohexanol. When the oxygen-containing gas is conducted through the liquid cyclohexane in the form of small bubbles, the formation of higher oxidation products is favored, e.g., that of adipic acid. However, when the gas bubbles introduced are of a diameter of more than 6 mm., e.g., 20 mm., the formation of cyclohexanone and cyclohexanol is favored. Similar conditions prevail with reducible materials convertible into different products by consecutive reaction by means of a mixture of hydrogen with inert gas, e.g., at the reduction of liquid nitrocyclohexane with a mixture of nitrogen and hydrogen in the presence of a palladium catalyst.

The invention now will be further illustrated by means of the following examples. However, it should be understood that these are given merely by way of explanation, not of limitation, and that numerous changes may be made in the details without departing from the spirit and the scope of the invention as hereinafter claimed.

*Example 1*

23 l./h. (liters per hour) cyclohexane are oxidized at a temperature of 158° C. with a mixture of oxygen and nitrogen containing 5 percent by volume oxygen. The quantity of gas introduced amounts to 8,800 l./h. As catalyst 1.33 g. cobalt naphthenate are added per 28 l. cyclohexane, i.e., 0.475 g./l., and 13.3 g. benzaldehyde per 28 l. cyclohexane, i.e., 0.475 g./l. The pressure is held at 10 kg./cm.$^2$.

When the gas is entered in the form of bubbles having a diameter of 4 mm., a reaction mixture of the following composition is obtained:

Cyclohexane, 92.65 percent by weight, cyclohexanone, 14.6 g./l., cyclohexanol, 24 g./l., esters, 50.5 millival/liter, acid, 66.8 millival/liter. A millival denotes "milliequivalent weight."

Under these reaction conditions, the conversion amounts to 6 percent. The yield of cyclohexanone and cyclohexanol, calculated on the reacted cyclohexane, is 69.8 percent. The amounts of ester and the yields of cyclohexanol and cyclohexanone relate to both the free cyclohexanol and that bound in the esters.

When the gas, under otherwise the same reaction conditions, is entered in the reaction in the form of bubbles having a diameter of 15 mm. a reaction mixture of the following composition is obtained:

Cyclohexane, 92.4 percent, cyclohexanone, 15.7 g./l., total cyclohexanol, 25 g./l., ester, 43 millival/l., acid, 68 millival/l. The conversion is 6.12 percent by weight, and the total yield of cyclohexanol and cyclohexanone 72.8 percent.

In a further experiment, the gas was introduced in the form of bubbles of 20 mm., diameter. The reaction mixture obtained had this composition:

Cyclohexane, 92.8 percent by weight, cyclohexanone, 15.4 g./l., total cyclohexanol, 25.6 g./l., esters, 36 millival, acids, 62.4 millival. The conversion is 5.92 percent by weight and the yield of cyclohexanol and cyclohexanone, calculated on the reacted cyclohexane, is 75.2 percent.

Example 2

In a hydrogenation device, a mixture of crystallized cyclohexylhydroxylamine and nitrocyclohexane is present in a proportion of 9:1, suspended in five times the quantity methanol, together with 10 percent of a palladium-asbestos catalyst. A temperature of 40° C., is maintained in the reaction chamber. Into the upper part of the hydrogenation device, as replacement a 20 percent methanolic solution consisting of 12.9 parts by weight nitrocyclohexane in 65.2 parts by volume methanol and containing 1 percent catalyst is entered. Into the lower part of the hydrogenation device, a circulating gas mixture is entered consisting of 50 percent by volume nitrogen and 50 percent by volume hydrogen to which, per hour, 4,760 parts by volume fresh hydrogen are added. The hydrogen flows through the reaction chamber containing the liquid in very finely divided form, i.e., it has a bubble diameter of approximately 2 mm. From the reaction chamber, a quantity of reacted product corresponding to the quantity of new solution added is removed as a suspension. The major part of the cyclohexylhydroxylamine and the catalyst are filtered off. The methanol is distilled from the filtrate, and part of the former is recycled over the filter residue to extract the cyclohexylhydroxylamine fully therefrom. The remainder is catalyst which, together with the remainder of the distilled methanol, is re-used for the preparation of new solution.

From the concentrated methanol extract, after cooling, 9.30 parts by weight per hour cyclohexylhydroxylamine are separated, corresponding to a yield of 90 percent calculated on the reacted hydrogen. The residue of the extract contains cyclohexylhydroxylamine crystals which are separated. The residue then contains little cyclohexylamine which is removed, and the unreacted nitrocyclohexane is recycled to the fresh solution.

If the gas mixture is introduced in the form of bubbles of approximately 20 mm. diameter, under otherwise equal reaction conditions 9.7 parts by weight per hour cyclohexylhydroxylamine whereas practically no cyclohexylamine forms.

I claim as my invention:

A process for the production of cyclohexanol and cyclohexanone by the oxidation of cyclohexane with substances selected from the group consisting of oxygen and mixtures of oxygen with inert gases at approximately 158° C. and at a pressure of substantially 10 kg./cm.$^2$, which comprises introducing said substances in form of bubbles having a diameter of at least 15 mm., thus attaining a strong liquefaction of the boundary layer.

References Cited in the file of this patent

UNITED STATES PATENTS

| | | |
|---|---|---|
| 2,423,180 | Doumani et al. | July 1, 1947 |
| 2,615,921 | Dougherty, et al. | Oct. 28 1952 |
| 2,969,393 | Joris | Jan. 24, 1961 |

FOREIGN PATENTS

| | | |
|---|---|---|
| 945,447 | Germany | July 12, 1956 |